United States Patent

[11] 3,612,974

[72] Inventors Edgar Wolf
New Hyde Park;
Edward Henry Lau, Old Westbury, all of N.Y.
[21] Appl. No. 826,383
[22] Filed May 21, 1969
[45] Patented Oct. 12, 1971
[73] Assignee Digitronics Corporation
Nassau County, N.Y.

[54] DIGITAL MOTOR SPEED CONTROL
9 Claims, 1 Drawing Fig.
[52] U.S. Cl. .................................................. 318/314,
318/257, 318/329
[51] Int. Cl. ................................................... H02p 5/06
[50] Field of Search .......................................... 318/318,
314, 341, 329, 326.8

[56] References Cited
UNITED STATES PATENTS
3,340,951 9/1967 Vitt ............................... 318/314
3,409,814 11/1968 Azuma et al. ................... 318/341
Primary Examiner—Oris L. Rader
Assistant Examiner—Robert J. Hickey
Attorney—Yuter and Fields ABSTRACT: A motor generates first pulses having a frequency related to the speed of rotation of the motor. Second pulses having durations at least greater than a minimum time duration are generated in response to the first pulses. Third pulses having durations related to the time differences between the terminations of the second pulses and the initiations of the first pulses are generated and used to pulse drive the motor.

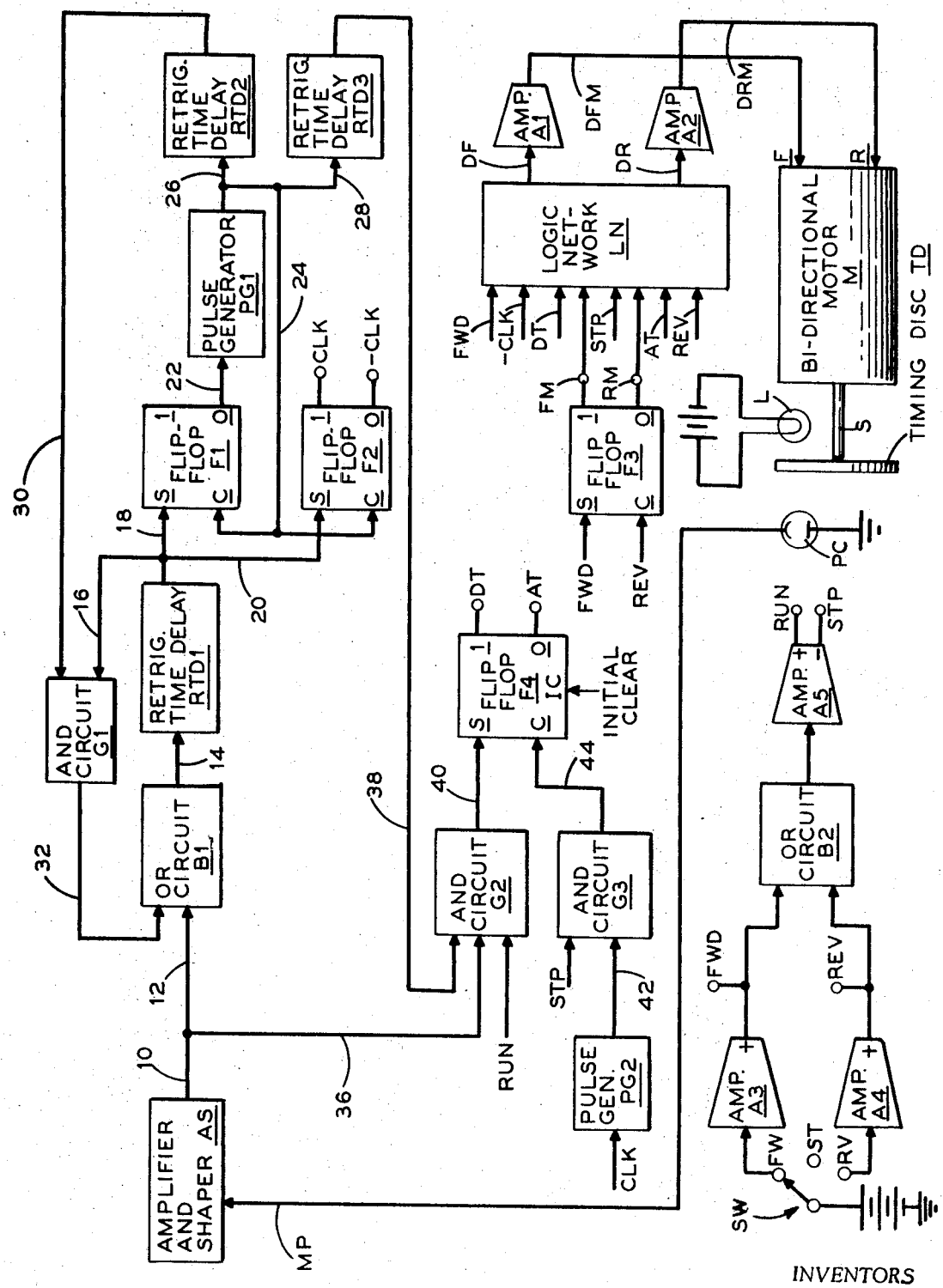

DIGITAL MOTOR SPEED CONTROL

This invention pertains to speed control systems and more particularly to a servosystem for controlling the speed of rotation of a motor.

Speed control of motors is required in many systems. One system wherein precise speed control is required is in driving the capstans of a magnetic tape recording system. Except for pinch roller and vacuum operated capstans, the most common mode of tape motion control is some form of low inertia servomotor. The motor speed is sensed by tachometers, timing wheels and the like to generate speed control signals. The circuits used are generally linear. However, some use fixed width current pulses which are fed to the motor whenever its speed drops below a threshold. Some use pulse width modulated control systems which perform start/stop operations wherein pulses derived from the rotating motor are compared against a fixed frequency pulse oscillator. However, these systems present problems of getting into synchronism with the fixed frequency reference oscillator.

It is accordingly a general object of the invention to provide an improved motor speed control for a start/stop motor which can be rapidly accelerated from rest to an operating speed or rapidly decelerated from the operating speed to rest.

It is another object of the invention to provide an improved speed control for a motor by feeding to the motor pulse-width modulated current pulses.

It is a further object of the invention to provide an improved pulse-width modulated motor speed control using self synchronization techniques as opposed to reference oscillators.

Briefly, the invention contemplates speed control apparatus for a pulse-signal driven motor comprising a first pulse-generating means connected to the motor for generating first pulses wherein the time between successive pulses is a function of the speed of rotation of the motor. Second pulse-generating means receive the first pulses and for each first pulse received generates a second pulse having a duration greater than a fixed minimum duration. Third pulse-generating means responsive to the second pulse-generating generating means generates third pulses, wherein each third pulse has a time duration related to the time interval between the end of one of the second pulses and the start of the next occurring first pulse.

Other objects, the features and advantages of the invention will be apparent from the following detailed description when read with the accompanying drawing whose sole FIGURE shows schematically apparatus for practicing the invention.

The system as shown controls the speed of bidirectional motor M. Motor M can be of the direct current type which is driven forward (clockwise) in response to the pulses of positive currents received at its input F and in the reverse direction (counterclockwise) in response to pulses of positive currents received at its input R. The motor M can drive a tape capstan (not shown). Connected to the shaft S of Motor M is a timing disc TD. Timing disc TD can be an opaque disc with a plurality of transparent radial spokes. On one side of timing disc TD is a lamp L, and on the other side is a photocell PC. Each time a radial spoke is opposite lamp L, photocell PC transmits a pulse, via the MP signal line, to amplifier and shaper AS. Amplifier and shaper AS can be a circuit which shapes the input signal to a pulse with sharply defined leading and trailing edges, such as a Schmitt trigger circuit. Thus for each pulse generated by photocell PC there is a sharply defined pulse emitted onto line 10.

For the time being, it will be assumed that motor M is running at close to the desired speed. Thereafter, starting and stopping of the motor both in the forward and reverse directions will be described. Accordingly, each pulse on line 10 passes via line 12 to one input of OR-circuit B1. OR-circuit B1 can be a circuit which passes a positive signal as long as any one of its inputs is positive. The output of OR-circuit B1 is connected via line 14 to the input of retriggerable time delay RTD1 which can be a multivibrator which starts emitting a positive pulse at the instant its input goes positive and keeps emitting the pulse until a given period of time has elapsed after its input returns to a negative level. Thus, the duration of the pulse may vary from a given minimum pulse duration up to the sum of that minimum pulse duration and the period of time the input is positive. The output of time delay RTD1 is connected via line 16, to one input of AND-circuit G1; via line 18, to the set input S of flip-flop F1; and, via line 20, to the set input S of flip-flop F2. AND-circuit G1 can be a coincidence circuit whose output is positive only when all its inputs are positive. Flip-flop F1 is a clear-dominant flip-flop whose 1 output is positive and whose 0 output is negative after the receipt of a positive pulse at its set input S and whose outputs then reverse state following the receipt of a positive pulse at its clear input C. It switches on the trailing edge of an input pulse. Flip-flop F2 is similar thereto, but switches on the leading edge of an input pulse. The 0 output of flip-flop F1 is connected, via line 22, to the input of pulse generator PG1.

Pulse generator PG1 is a circuit which emits a short duration pulse only after its input has been continuously negative for a given period of time. Pulse generator PG1 can be a unijunction transistor oscillator. The output of pulse generator PG1 is connected: via line 24, to the clear input C of flip-flops F1 and F2; via line 26, to the inputs of retriggerable time delay RTD2; and via line 28, to the input of retriggerable time delay RTD3. Time delays RTD2 and RTD3 can be similar to time delay RTD1 but with different time delays. The output of time delay RTD2 is connected, via line 30, to the second input of AND-circuit G1 whose output is connected via line 32, to the second input of OR-circuit B1.

In operation, a pulse from amplifier and shaper AS passes through OR-circuit B1 causing the input of time delay RTD1 to go positive. In response thereto, the output of time delay RTD1 goes positive setting flip-flop F2 making the signal on the CLK line positive and the signal on the −CLK line negative. At the same time, the output of time delay RTD1 is fed, via line 16, to one input of AND-circuit G1. Because of the prior triggering of time delay RTD1 by the first, just previous pulse on line 10, line 30 is transmitting a pulse to the second input of AND-circuit G1. Accordingly, line 32 is positive. When the pulse disappears on line 12, the state of line 14 feeding the input to time delay RTD1 is dependent on the state of line 32. Therefore, when the pulse terminates on line 30 the input of time delay RTD1 goes negative and the given time interval starts. At the end of this time interval, the output of time delay RTD1 goes negative and the positive pulse on line 18 terminates, triggering flip-flop F1 to the set state. A negative signal is transmitted on line 22 to pulse generator PG1 starting its timing interval. A given period of time thereafter, pulse generator PG1 emits a very sharp pulse which clears flip-flops F1 and F2 and triggers time delays RTD2 and RTD3 (when flip-flop F2 cleared, a positive voltage appeared on line −CLK which will remain positive until flip-flop F2 is again set. This setting will occur when the next pulse from photocell PC, via line MP, amplifier AS, line 12, OR-circuit B1 and line 14 triggers the time delay RTD1 on.). Time delay RTD2 then transmits a pulse of fixed time duration to AND-circuit G1.

Now the positive voltage on line −CLK is effectively the signal used to drive the motor. It should be noted that this positive voltage is a pulse which starts a fixed period of time after the output of time delay RTD1 returns to a negative voltage. (This fixed period of time is established by pulse generator PG1.) However, the output of time delay RTD1 goes negative another fixed period of time after the voltage on line 32 goes negative. (This other fixed period of time is established by time delay RTD1.) Thus, there is a total fixed time minimum delay after line 32 goes negative. This total fixed time delay is equal to the sum of the fixed delays introduced by time delay RTD1 and pulse generator PG1. The start of the negative voltage pulse of line −CLK is when the output of time delay RTD1 goes positive at the leading edge of the pulse on line 12 (i.e., in effect, the pulse from the photocell PC). Thus, the width of the positive pulse on line −CLK is basically a function of the time of termination of a pulse from time delay RTD1 (to which the time delay of pulse generator PG1 is added), which was initiated by a pulse from photocell PC, and the time of the start of the next pulse from time delay RTD1, initiated by the next pulse from photocell PC. Thus, if the motor M speeds up, the positive pulses on line −CLK become narrower and if the motor M slows down, these pulses become longer. It should be noted that if motor M speeds up beyond a certain speed no pulse is generated by pulse generator PG1 and the voltage on line −CLK will remain negative and no pulses will be fed to the motor M until it slows down below this certain speed. Therefore, it is possible to rapidly speed up the motor from rest without the fear of excessive overspeed and at the same time keep the motor in synchronization for varying loads.

The −CLK signal line is fed to logic network LN. Logic network LN can be an array of AND-circuits and OR-circuits which satisfy the following Boolean Equations:

$$(-CLK \cdot FWD) + (DT \cdot STP \cdot RM) + (FWD \cdot AT) = DF$$
$$(-CLK \cdot REV) + (DT \cdot STP \cdot FM) + (REV \cdot AT) = DR$$

If the motor M is being driven in the forward direction, the FWD signal will be present and, in substance in the logic network LN, −CLK=DF  and DR =0.

Therefore, logic network LN transmits pulses on the DF line to amplifier A1 which in turn transmits pulses on the DFM line to the F input of motor M. If the motor M is being driven in the reverse direction, the REV signal is present and −CLK=DR and DF=0 in the logic network. In this case, logic network LN transmits pulses on the DR line to amplifier A2 which in turn transmits pulses on the DRM line to the R input of motor M. In either of these two cases the widths of the pulses on the lines DFM and DRM follow the widths of the pulses on line −CLK.

The signals on FWD and REV signal lines are generated in accordance with the setting of switch SW. The movable contact of switch SW is returned to a positive voltage source shown as a battery. One fixed contact FW is connected to the input of amplifier A3 whose positive output is connected to the FWD line. Another fixed contact RV is connected to the input of amplifier A4 whose positive output is connected to the REV signal line. The FWD and REV signal lines are fed via OR-circuit B2 to the input of paraphase amplifier A5 whose positive output is connected to the RUN signal line and whose negative output is connected to the STP signal line.

When switch SW is on the FW position, the FWD line is positive, the REV line negative, the RUN line positive and the STP line negative. When the switch SW is on the RV position, the FWD line is negative, the REV line positive, the RUN line positive and the STP line negative. When the switch SW is on the ST position, the line FWD is negative, the REV line negative, the RUN line negative and the STP line positive.

At start-up of the motor M, an initial clear signal clears flip-flop F3 (flip-flop F3 is similar to flip-flop F2) which generates a positive signal on line AT. When switch SW is placed in the FW (forward) or RV (reverse) position the RUN signal line goes positive. Note that this line is connected to an input of AND-circuit G2.

If switch SW is in the FW position, then the FWD signal is present and logic network LN generates the following signals:
$$(FWD \cdot AT) = DF = 1, \quad \text{and } DR = 0.$$

Therefore a continuous positive voltage is fed to the F input of motor M. It should be noted that the usual −CLK pulses are also generated but the combination of the FWD and AT signals override their effect. This continues until a pulse from amplifier and shaper A5, via line 36, coincides with a pulse from time delay TRD3, via line 38, at inputs to AND-circuit G2, i.e., when the motor M reaches operating speed. At that time AND-circuit G2 transmits a pulse to the set input of flip-flop F3 which sets. Line DT goes positive and line AT goes negative. Thereafter, the line DF follows the voltage on the −CLK line as previously described. The same operation occurs when the motor M is to drive in the reverse direction, except that the REV line is positive and logic network LN transmits the continuous positive voltage on line DR.

To stop the motor M, it is necessary to reverse the direction of current flow thereto. Therefore, it is first necessary to know which direction the motor has been running. This is accomplished by flip-flop F4 whose set input S is connected to the FWD line and whose clear input C is connected to the REV line. Thus, the flip-flop is set and generating the FM signal during initial forward drive, and is cleared and generating the RM signal during initial reverse drive. When switch SW is positioned on the ST contact, the RUN line goes negative and the STP line goes positive. Line STP is connected to an input of AND-circuit G3 which is alerted and is connected to logic network LN.

Assume that motor M had been running forward, then logic network LN performs the following function DT·STP·FM= DR=1 and DF=0 and a continuous positive voltage is fed to the R input of motor M. This continues until the width of the positive pulses on line CLK is sufficiently narrow to allow pulse generator PG2 to fire. (Pulse generator PG2 is similar to previously described pulse generator PG1.) At that time, pulse generator PG2 emits a pulse, via line 42, AND-circuit G3 and line 44 to the clear input C of flip-flop F3 which is cleared. The voltage on line DT goes negative as does the voltage on line DR. No more power is applied to motor M which coasts to a stop.

If motor M had been running in the reverse direction and was to be stopped, the RM line would have been positive and the functions $$RM \cdot DT \cdot STP = DF = 1 \text{ and } DR = 0$$

would be performed by logic network LN and a continuous positive voltage would be fed to the F input of motor M. This would continue until flip-flop F3 was cleared as described above. At that time no power would be fed to the motor and it would coast to a stop.

Although positive logic using AND-circuits and OR-circuits has been shown, it should be apparent that negative logic and/or NAND-circuits and NOR-circuits could be employed. In addition, although the signals were described as swinging between positive and negative values it should be equally apparent that the signals could swing between high and low values or a given value and ground.

There has thus been shown improved apparatus for controlling the speed of a motor by using pulse-width modulated signals derived from pulses generated by the motor and fixed time interval pulses synchronized with the pulses generated by the motor.

What is claimed is:

1. Apparatus for controlling the speed of a motor which is driven by pulse signals comprising first pulse-generating means connected to said motor for generating first pulses wherein the time between successive pulses is a function of the speed of rotation of said motor, second pulse-generating means receiving said first pulses for initiating the generation of a second pulse having a variable duration of time and for terminating said second pulse if the time between successive first pulses is greater than a preselected minimum interval of time, third pulse-generating means for generating third pulses wherein each third pulse has a time duration related to the time interval between the instant of termination of one of said second pulses associated with one of said first pulses and the instant of initiation of the next occurring first pulse, and means for transmitting said third pulses to said motor.

2. The apparatus of claim 1 wherein said second pulse-generating means comprises a first pulse generator including input means for receiving in parallel two different pulse signals, said first pulse generator generating a first timing pulse signal which starts at the time of receipt of at least one of said pulse signals and terminates a given fixed period of time after the termination of both of said two different pulse signals, a second pulse generator connected to said first pulse generator for generating a second timing pulse signal having a fixed duration of time and activated at a predetermined time after the termination of said first timing pulse, means for connecting said first pulse-generating means and said second pulse generator to the input means of said first pulse generator whereby the two different pulse signals received are said first pulses and said second timing pulse signals.

3. The apparatus of claim 2 further comprising means for preventing the activation of said second pulse generator whenever the time between the termination of one timing pulse and the start of the next timing pulse is less than said predetermined time.

4. The apparatus of claim 3 wherein said third pulse-generating means is connected to said first and second pulse generators so that each third pulse starts at the start of a second timing pulse signal and terminates at the end of the next occurring first timing pulse signal.

5. The apparatus of claim 1 wherein said second pulse-generating means comprises a first time delay means, said first time delay means having first and second inputs and an output and including means for generating a pulse signal which starts upon receipt of a pulse signal by at least one of said inputs and ends a first fixed period of time after the termination of pulse signals at both of said inputs, one of said inputs receiving said first pulses, a second time delay means having an input and an output and including means for generating a second pulse signal a second fixed period of time after receipt of a signal at its input, means for connecting the output of said first time delay means to the input of said second time delay means for transmitting a signal to the latter at the end of each first pulse signal generated by the former, and means for connecting the output of said second time delay means to the other input of said first time delay means.

6. The apparatus of claim 5 wherein said means for connecting the output of said second time delay means to the other input of said first time delay means is means for generating a third pulse signal of predetermined time duration.

7. The apparatus of claims 5 wherein said means for generating the third pulses comprises a bistable means having first and second inputs wherein a signal received at said first input triggers said means to a first state and a signal received at said second input triggers said means to a second state, said first input being connected to output of said first time delay means and said second input being connected to the output of said second time delay means.

8. The apparatus of claim 1 further comprising means for applying a continuous signal to the motor until the latter reaches a given speed during the start up period.

9. The apparatus of claim 1 further comprising means for applying a braking signal to the motor until the latter slows down to a given speed during the stopping period.